US009149834B2

United States Patent
Guha et al.

(10) Patent No.: US 9,149,834 B2
(45) Date of Patent: Oct. 6, 2015

(54) PLASMA TREATED MOLDING COMPOSITION AND PROCESS FOR MODIFYING A SURFACE THEREOF

(75) Inventors: Probir Kumar Guha, Troy, MI (US); Michael J. Siwajek, Oakland Township, MI (US); Brad Anthony Haskell, Lake Orion, MI (US); SudarSan Neogi, East Brunswick, NJ (US)

(73) Assignee: Continental Structural Plastics, Inc., Troy, MI (US)

( * ) Notice: Subject to any disclaimer, the term of this patent is extended or adjusted under 35 U.S.C. 154(b) by 0 days.

(21) Appl. No.: 13/555,590

(22) Filed: Jul. 23, 2012

(65) Prior Publication Data

US 2013/0136929 A1    May 30, 2013

Related U.S. Application Data

(60) Provisional application No. 61/510,740, filed on Jul. 22, 2011.

(51) Int. Cl.
*B05D 3/14* (2006.01)
*B29C 59/14* (2006.01)

(52) U.S. Cl.
CPC ........... *B05D 3/144* (2013.01); *B29C 59/14* (2013.01); *B29C 2059/147* (2013.01)

(58) Field of Classification Search
CPC .......... B05D 3/144; B05D 7/52; B29C 59/14; B29C 2059/147; Y10T 428/31511; Y10T 428/31576; Y10T 428/31786
USPC ............. 427/536; 428/423.3, 424.4; 524/556
See application file for complete search history.

(56) References Cited

U.S. PATENT DOCUMENTS

| 6,165,565 | A | 12/2000 | Schelhorn et al. |
| 6,558,799 | B2 * | 5/2003 | Takeuchi et al. ........... 428/423.1 |
| 2003/0175488 | A1 * | 9/2003 | Asthana et al. ............... 428/212 |
| 2007/0166479 | A1 * | 7/2007 | Drake et al. .................. 427/535 |
| 2009/0155604 | A1 * | 6/2009 | Haack et al. .................. 428/429 |
| 2010/0104769 | A1 | 4/2010 | Boisseau et al. |
| 2013/0136929 | A1 | 5/2013 | Guha et al. |

OTHER PUBLICATIONS

Dr. Gupta Verlag, In-line Plasma Treatment of Plastics, GAK, 2008, p. 681-748, issue 11, Germany.
Hatsuo Ishida, Characterization of Composite Materials, 2010, p. 22.
Dr. Hartwig Lohse, Stephen Pitman, Joining of Plastics by Adhesive Bonding in Automotive Engineering.
Ajoy K. Chanda and Swati Neogi, Study of the Effect of Radio-Frequency (RF) Plasma on Sheet Moulding Compound (SMC) to Improve Adhesion, India.
Vantico Adhesives and Tooling, Araldite 4945 A/B Polyurethane adhesive for primerless SMC bonding, Mar. 2001, England.

* cited by examiner

*Primary Examiner* — Thao T Tran
(74) *Attorney, Agent, or Firm* — Avery N. Goldstein, Esq.; Blue Filament Law, PLLC

(57) ABSTRACT

A process for applying an overlayer to a cured thermoset molding composition is provided that includes exposing the cured thermoset molding composition to a plasma under conditions that modify the surface energy of a surface of the article without visually modifying the surface. The surface of the article is then overcoated with an overlayer having superior adhesion to a like article absent the intermediate plasma treatment. A component is also provided that is cured thermoset resin article having a shape and a surface. An overlayer is applied to the surface while the surface is still plasma activated. The overlayer is adhesion is unchanged by 4 weeks in a 100% humidity chamber at 30° C. over at least 95 area % of an interface between the overlayer and the surface.

7 Claims, 2 Drawing Sheets

PLASMA TREATED MOLDING COMPOSITION AND PROCESS FOR MODIFYING A SURFACE THEREOF

CROSS REFERENCE TO RELATED APPLICATIONS

This application claims priority benefit of U.S. Provisional Application Ser. No. 61/510,740 filed 22 Jul. 2011; the contents of which are hereby incorporated by reference.

FIELD OF THE INVENTION

The present invention in general relates to sheet molding composition (SMC) and bulk molding composition (BMC) that are cured to form various articles, and in particular to the plasma treatment of such an article to modify article surface properties for representative purposes including overcoating, lamination, and surface finish.

BACKGROUND OF THE INVENTION

The usage of sheet molding compositions (SMCs) and bulk molding compositions (BMCs) have expanded as the ability to improve surface finish properties and physical properties such as strength of articles formed from the cured thermoset resins have improved. However, in spite of the improvements in these materials, the production of coated or multilayer molding composition articles so as to adhere thermoplastics and inorganic coatings has proven a difficult task owing to high molding composition article surface energies as measured by water droplet contact angle. The high surface energies manifest in incomplete and poor adhesion between the SMC or BMC and the overlayers. While the quality of surface finish and bonding properties are modified by the inclusion of a low profile additive such as a thermoplastic or elastomer into the thermoset resin composition, overlayer adhesion remains a problem. While improvement of interfacial adhesion has been achieved with base material formed of thermoplastics, elastomers, fluoropolymers through flame treatment and/or plasma treatment, extension of these results to SMC and BMC has proven difficult to implement on a production scale.

Surface properties of SMC's and BMC's have previously been modified through rendering the thermoset cured article electrically conductive to a sufficient extent to allow for powder prime coating, as detailed, for example in U.S. Pat. No. 7,655,297; yet numerous coatings still have poor adhesion to cured SMC or BMC.

Thus, there exists a need for a process to treat a cured thermoset SMC or BMC article to promote adhesion of an overlayer thereto. Such an overlayered material with strong adhesion between SMC or BMC article and the overlayer are suitable for a variety of applications previously unavailable to SMC or BMC materials including those in the fields of automotive, aerospace, and architectural structures.

SUMMARY OF THE INVENTION

A process for applying an overlayer to a cured thermoset molding composition is provided that includes exposing the cured thermoset molding composition to a plasma under conditions that modify the surface energy of a surface of the article without visually modifying the surface. The surface of the article is then overcoated with an overlayer having superior adhesion to a like article absent the intermediate plasma treatment.

A component is also provided that is cured thermoset resin article having a shape and a surface. An overlayer is applied to the surface while the surface is still plasma activated. The overlayer being substantially unchanged by 4 weeks in a 100% humidity chamber at 30° C. at least 95 area % of an interface between the overlayer and the surface.

BRIEF DESCRIPTION OF THE DRAWINGS

The present invention is further detailed with respect to the following that are intended to illustrate particular aspects of the present invention. It is appreciated that the present invention should not be construed as being limited only to those aspects of the invention depicted herein.

DETAILED DESCRIPTION OF THE PREFERRED EMBODIMENTS

Figure 1:
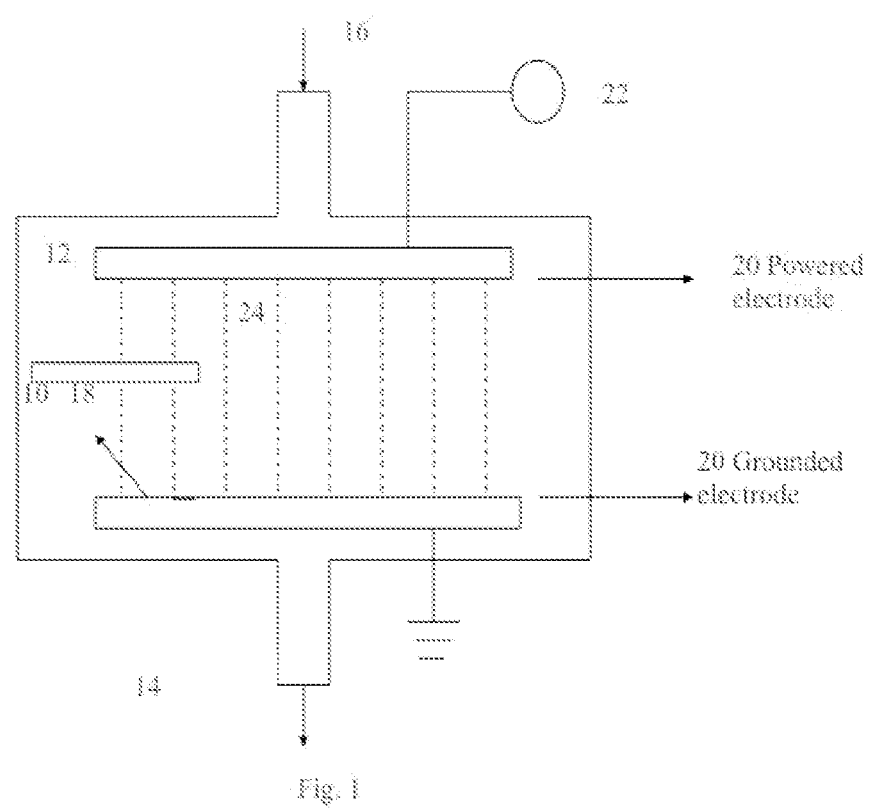
FIG. 1 is a schematic of plasma enhanced chemical vapor deposition (PECVD) chamber used herein.

The present invention has utility as a process for improving overlayer adhesion to a cured article formed from a molding composition. The present invention also has utility in forming overlayer coated molding composition articles having superior interfacial adhesion.

The present invention exposes a surface of a cured molding composition to a flame or plasma discharge under conditions sufficient to modify the surface energy values of the treated surface by greater than 10% relative to the pretreatment surface energy value and preferably greater than 30% and more preferably greater than 50%. Surface energy values are readily determined using a Goniometer with respect to water by conventional techniques. The surface treatment is readily applied to a cured SMC or BMC composition. In certain embodiment of the present invention, the surface treatment according to the present invention does not change the physical appearance of the surface even though chemical properties of the surface are modified. As used herein, a lack of visual modification of the surface is defined as the surface being substantially free of pitting or discoloration when the surface is observed with an optical microscope at a magnification of 100×. As used herein "substantially" is defined as less than 5% of the surface area is covered by pits or discoloration.

Base formulations suitable for usage herein illustratively include those described in U.S. Pat. Nos. 4,260,538; 4,643,126; 5,100,935; 5,268,400; 5,854,317 and 6,780,923.

A principal component of an SMC or BMC formulation is a cross-linkable polymer resin such as an unsaturated polyester resin or vinyl ester resin. The prepolymer polymeric resin has a molecular weight on average of typically between 400 and 100,000 Daltons. The polyester prepolymer resins typically represent condensation products derived from the condensation of unsaturated dibasic acids and/or anhydrides with polyols. It is appreciated that the saturated di- or polyacids are also part of the condensation process to form polyester prepolymers with a lesser equivalency of reactive ethylenic unsaturation sites.

Vinyl ester resins are also typically employed in SMC or BMC formulations as a polymeric resin. Vinyl ester prepolymer resins are typically the reaction product of an epoxy resin with a carboxylic acid having a single ethylenic unsaturation. Specific vinyl ester resins commonly used are the reaction product of epoxy functionalized bisphenol A with an acrylic acid. As a result of the difference in prepolymer synthesis, the vinyl ester resin prepolymers are typically associated with terminal ethylenic unsaturations while polyester resin prepolymers predominantly have ethylenic unsaturations internal to the prepolymer backbone.

The polymeric resin prepolymer is suspended, and preferably dissolved, in an ethylenically unsaturated monomer that copolymerizes with the resin during the thermoset process. Representative monomers are those optionally mixed with the isocyanate component of the inventive thickener. Preferably, the base molding composition monomer and the optional monomer component in which the isocyanate component of an inventive formulation is mixed are identical. It is appreciated that more than one type of monomer can be used in a molding composition. The monomer provides benefits including lower prepolymer viscosity and thermosetting without formation of a volatile byproduct. Monomer is typically present up to 18.5 total weight percent of a molded article.

A typical molding composition includes a free radical initiator to initiate cross-linking between the polymeric prepolymer resin with itself or with ethylenically unsaturated monomer, if present. A free radical initiator is typically chosen to preclude significant cross-linking at lower temperature so as to control the thermoset conditions. Conventional free radical polymerization initiators contain either a peroxide or azo group. Peroxides operative herein illustratively include benzoyl peroxide, cyclohexanone peroxide, ditertiary butyl peroxide, dicumyl peroxide, tertiary butyl perbenzoate and 1,1-bis(t-butyl peroxy) 3,3,5-trimethylcyclohexane. Azo species operative herein illustratively include azobisisobutyronitrile and t-butylazoisobutyronitrile. While the quantity of free radical polymerization initiator present varies with factors such as desired thermoset temperature and decomposition thermodynamics, an initiator is typically present from 0.1 to 3 total weight percent. In order to lessen cross-linking at temperatures below the desired thermoset temperature, a polymerization inhibitor is often included in base molding formulations. Hydroquinone and t-butyl catechol are conventional inhibitors. An inhibitor is typically present between 0 and 1 total weight percent of the fully formulated formulation inclusive of fillers.

The molding composition preferably includes a particulate filler. Particulate fillers operative in such molding compositions illustratively include calcium carbonate, calcium silicate, alumina, silica, talcs, dolomite, vermiculite, diatomaceous earth, glass spheres, graphite, metal, renewable resource plant derived materials, and combinations thereof. Factors relevant in the choice of a particulate filler illustratively include filler cost, resultant viscosity of flow properties, resultant shrinkage, surface finish weight, flammability, electrical conductivity, and chemical resistance of the thermoset formulation. Particulate filler typically accounts from 0 to 80 weight percent of the fully formulated formulation inclusive of fillers. Typical filler sizes are from 0.1 to 50 microns.

A fiber filler is typically added to provide strength relative to a particulate filler. Fiber fillers operative herein illustratively include glass, carbon, polyimides, polyesters, polyamides, and natural fibers such as cotton, silk, and hemp. Preferably, the fiber filler is glass fiber in the form of chopped glass strands. More preferably, chopped glass strands are provided in lengths ranging from 5 to 50 millimeters. Fiber fillers are typically present from 0 to 80 total weight percent of the fully formulated formulation inclusive of fillers.

A mold release agent is typically provided to promote mold release. Mold releases include fatty acid salts illustratively including oleates, palmitates, stearates of metal ions such as sodium, zinc, calcium, magnesium, and lithium. A mold release is typically present from 0 to 5 total weight percent of the fully formulated formulation inclusive of fillers.

A low profile additive is optionally provided to improve surface properties and dimensional stability of a resulting molded product. Low profile additives illustratively include thermoplastics and elastomers such as polyethylene, polystyrene, polyvinyl toluene, polyacrylates, polyethylene ether polymers, polyphenylene oxide polymers, and combinations thereof. Copolymers operative as low profile additives include the above-recited polymers in addition to copolymers of the same including butadiene, acrylonitrile, and vinyl chloride. Low profile additives are typically present from 0 to 50 total weight percent and more often from 5 to 40 total weight percent of the fully formulated formulation inclusive of fillers.

It is appreciated that the present invention optionally also incorporates additional additives illustratively including flame retardants, plasticizers, colorants, and other processing additives conventional to the art.

In addition to forming an article directly from a molding composition, it is appreciated that an inventive molding compound is readily penetrated onto various porous substrates illustratively including metal wire mesh.

According to the present invention, the molding composition is cured in a conventional manner based on the quantity and nature of the free radical initiator present with the understanding that thermoset cure rate and cross linking density are dictated by factors including cure temperature, polymeric resin prepolymer molecular weight, reactive cure moiety density, and cross link density, the number of aliphatic unsaturation in a base polyester or vinyl ester resin and functionality of the cross-linking monomers. Upon cure of a molding composition under standard conditions, the resultant cured article is optionally heated, subjected to reduce pressure associated with vacuum draw, or combination thereof in order to remove residual volatile low molecular weight substances therefrom.

Treatment of a cured article is performed by exposing the cured article to a plasma to impart chemical changes that modify adhesion properties of surface but otherwise do not change the surface appearance. Surface energy modification is performed by exposing the side of the article intended to receive an overlayer with a corona treatment, atmospheric plasma treatment, flame treatment, or combinations thereof. Corona equipment, magnetrons, atmospheric plasma treatment equipment and flame plasma treatment equipment are commercially available from a variety of sources. Regardless of the nature of the plasma treatment, the present invention exposes a surface of the cured thermoset article to a gaseous glowing plasma region for a period of time sufficient to modify the surface electron distribution, induce scission of double bonds, and other chemical changes to the cured surface without inducing pitting, oxide coating deposition or other observable modifications of the surface.

According to the present invention, it has been surprisingly found that the complex mixtures cured to form SMC or BMC article including urea or urethane linkages derived from isocynates and further containing low profile thermoplastic additives achieve a sufficient degree of surface energy modification to achieve strong adhesion of an overlayer for a composition containing up to 65% fillers, 30% low profile additive and at least 20% curable resin.

Referring to FIG. 1, a cured thermoset article 10 with a surface to be treated so as to modify the surface energy thereof and is placed into a plasma chamber 12. The plasma chamber 12 is in fluid communication with a vacuum pump 14 able to reduce the partial pressure within chamber 12. The chamber 12 is also in fluid communication with a gas source 16. The gas source 16 to provide a non-deposition surface energy modification to the article 10. Gasses suitable for maintaining a plasma absent deposition or pitting of the surface 18 of the article 10 illustratively include the noble gasses, dinitrogen, oxygen, nitrogen, mixture of oxygen nitrogen, oxygen-argon; nitrogen-argon, and combinations thereof. Preferably, intermediate between gas supply 16 and the pump 14 a plasma generation source 20 is present and as depicted has a powered electrode and a grounded electrode. It is appreciated that in addition to the plasma source 20, other plasma sources operative herein include conventional plasma sources including a corona discharge, magnetron, flame plasma source, or chemical-air plasma source. The plasma source 20, it is coupled to a power source 22 capable of sustaining the plasma depicted at 24 within the chamber 12. It is appreciated that flame and chemical plasma sources 20 also include a consumable material input (not shown) for sustaining the plasma 24. Additionally, it is appreciated that the chamber 12 is open to ambient atmosphere in instances when the plasma source is open to atmosphere, there tends to be a high rate of ion bombardment on the surface 18 as compared to corona treatment and other forms of plasma treatment. After sufficient residence time in the plasma 24, the article 10 is removed therefrom and provided with an overlayer on surface 18. The overlayer 18 according to the present invention illustratively includes urethane alkyd coating resin, epoxy coating resin, powder prime coatings, polyethylene, polypropylene, polycarbonate, polyester, polyvinyl chlorides, and combinations thereof. Pure polyurethane is not used as an overlayer 18 according to the present invention. Preferably, the overlayer is applied within 1 hour and preferably within 7 days subsequent to plasma treatment so as to preclude reversion of the surface to a pretreatment, low surface energy.

The present invention is further detailed with respect to the following nonlimiting examples intended to illustrate certain aspects of the invention. These examples should not be construed as limiting the scope of the appending claims.

Example 1

Figure 2:
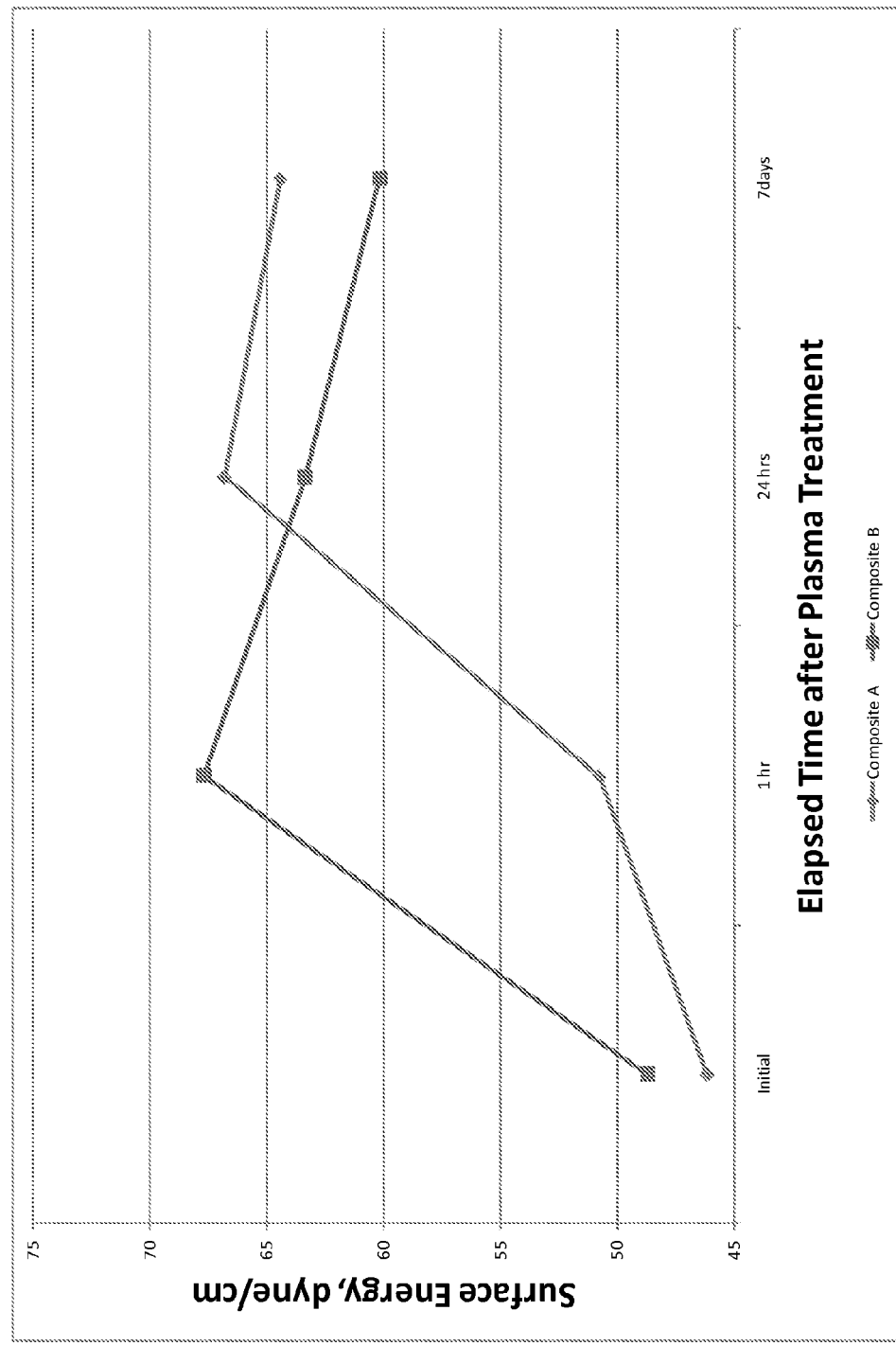
FIG. 2 is a plot of surface energy for a cured SMC panels as a function of the time after an initial plasma surface treatment.

Two conventionally cured SMC materials denoted as composites A (class "A" SMC) and B (low profile SMC) are examined by microscopy to establish a control surface image after 10 minutes of ultrasonic cleaning in isopropanol and acetone. The cured SMC articles are then exposed to an argon-oxygen, or nitrogen, or nitrogen-oxygen, or oxygen plasma at a pressure of 150 militorr for five minutes in the PECVD chamber operating at a radiofrequency of 13.56 Megahertz and a power of 150 Watts. In instances when a mixed gas is used, the secondary gas is present at 10 molecular mole percent of the carrier gas. Gas flow rate is maintained at a rate of 7, 10, or 14 sccm. After treatment, the SMC is observed under microscopy and shows no apparent surface modification at a magnification of 100×. Surface energy is measured by Goniometer measurement relation to water immediately and over a period of 7 days, as shown in FIG. 2 for SMC composites denoted as A and B. The resultant performance is summarized in Table 1. The surface energy is noted to have been raised from a value of about 40 dynes/cm to between 45 and 60 dynes/cm; and preferably, between 55 and 60 dynes/cm.

TABLE 1

Summary of results for inventive surface treatment of SMCs.

| SMC Label | SMC Type | Primers | Surface Treatment* |
|---|---|---|---|
| Composite 'A' | Class "A" SMC | None | No Scuff Sanded Surface Sand |
| | Class "A" SMC | Conventional Single Component Primer | No Scuff Sanded Surface Sand |
| | Class "A" SMC | 2-Component Urethane Primer | No Scuff Sanded Surface Sand |
| | Class "A" SMC | Conventional Single Componen Primer-Dual Source | No Scuff Sanded Surface Sand |
| | Class "A" SMC | None | Scuff Sanded Surface |
| | Class "A" SMC | Conventional Single Component Primer | Scuff Sanded Surface |
| | Class "A" SMC | 2-Component Urethane Primer | Scuff Sanded Surface |
| | Class "A" SMC | Conventional Single Componen Primer-Dual Source | Scuff Sanded Surface |
| Composite 'B' | Conventional Low Profile SMC | None | No Scuff Sanded Surface Sand |
| | Conventional Low Profile SMC | Conventional Single Component Primer | No Scuff Sanded Surface Sand |
| | Conventional Low Profile SMC | 2-Component Urethane Primer | No Scuff Sanded Surface Sand |
| | Conventional Low Profile SMC | Conventional Single Componen Primer-Dual Source | No Scuff Sanded Surface Sand |
| | Conventional Low Profile SMC | None | Scuff Sanded Surface |
| | Conventional Low Profile SMC | Conventional Single Component Primer | Scuff Sanded Surface |
| | Conventional Low Profile SMC | 2-Component Urethane Primer | Scuff Sanded Surface |
| | Conventional Low Profile SMC | Conventional Single Componen Primer-Dual Source | Scuff Sanded Surface |

Example 2

The plasma modified SMC surfaces of composites A and B per Example 1 are then exposed to Radio frequency of 13.56 MHz, with an exposure time of from 0.5 to 5 min at an RF power of 150 W. the RF power is also varied between 100 W and 500 W. The gas flow rate is 7, 10, or 14 sccm* at a gas pressure of 150 mtorr to apply a surface coating of either a conventional urethane alkyd coating resin or a conventional epoxy coating resin to a thickness of 300 microns. The overcoated SMC is placed in a weathering chamber having a temperature of 30° C. and a relative humidity (RH) content of 100%. The plasma treated SMC shows no appreciable weathering after 2 weeks in the weathering chamber whereas a comparable SMC similarly overcoated without an intermediate plasma surface chemical modification step exhibits overlayer blister and peel.

References recited herein are indicative of a level of skill in the art to which the invention pertains. These references are hereby incorporated by reference to the same extent as if each individual reference was explicitly and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A process for forming a multilayer article comprising:
exposing a cured thermoset molding article formed from a sheet molding composition of an aliphatically unsaturated polyester or a vinyl ester resin cross linked with polyurea linkages or polyurethane linkages, and containing a fiber filler of glass fibers or natural fibers or carbon fibers, or a combination thereof to a plasma under conditions that modify the surface energy of the article to between 45 and 60 dynes/centimeter without visually modifying the surface; and
overcoating the surface with an overlayer comprising a urethane alkyd resin to form the multilayer article.

2. The process of claim 1 wherein the plasma is generated with a corona discharge source.

3. The process of claim 1 wherein the plasma is generated with a magnetron.

4. The process of claim 1 wherein the plasma is generated with ambient pressure equipment.

5. The process of claim 1 wherein the surface energy is increased by greater than 10%.

6. A process for forming a multilayer article comprising:
exposing a cured thermoset molding article formed from a sheet molding composition of an aliphatically unsaturated polyester or a vinyl ester resin cross linked with polyurea linkages or polyurethane linkages, and containing a fiber filler of glass fibers or natural fibers or carbon fibers, or a combination thereof to a plasma under conditions that modify the surface energy of the article to between 45 and 60 dynes/centimeter without visually modifying the surface;
overcoating the surface with an overlayer comprising a urethane alkyd resin; and
wherein the article is a vehicle component to form the multilayer article.

7. The process of claim 6 wherein the vehicle component is a vehicle body panel.

* * * * *